(12) United States Patent
Peng et al.

(10) Patent No.: US 10,033,263 B2
(45) Date of Patent: Jul. 24, 2018

(54) SYSTEM AND METHOD FOR OPTIMIZING FUNDAMENTAL FREQUENCY MODULATION FOR A CASCADED MULTILEVEL INVERTER

(71) Applicant: BOARD OF TRUSTEES OF MICHIGAN STATE UNIVERSITY, East Lansing, MI (US)

(72) Inventors: Fang Zheng Peng, Okemos, MI (US); Shuitao Yang, Lansing, MI (US)

(73) Assignee: BOARD OF TRUSTEES OF MICHIGAN STATE UNIVERSITY, East Lansing, MI (US)

(*) Notice: Subject to any disclaimer, the term of this patent is extended or adjusted under 35 U.S.C. 154(b) by 0 days.

(21) Appl. No.: 15/188,218

(22) Filed: Jun. 21, 2016

(65) Prior Publication Data
US 2016/0380556 A1 Dec. 29, 2016

Related U.S. Application Data

(60) Provisional application No. 62/185,099, filed on Jun. 26, 2015.

(51) Int. Cl.
*H02M 1/12* (2006.01)
*H02M 7/483* (2007.01)
*H02M 7/49* (2007.01)

(52) U.S. Cl.
CPC ............ *H02M 1/12* (2013.01); *H02M 7/483* (2013.01); *H02M 7/49* (2013.01); *H02M 2007/4835* (2013.01)

(58) Field of Classification Search
CPC ........... H02M 1/12; H02M 2007/4835; H02M 7/483; H02M 7/49
See application file for complete search history.

(56) References Cited

U.S. PATENT DOCUMENTS

| | | | | |
|---|---|---|---|---|
| 5,642,275 A | * | 6/1997 | Peng | H02M 7/49 363/137 |
| 6,118,337 A | * | 9/2000 | Schweighofer | G01R 33/3852 330/10 |

(Continued)

OTHER PUBLICATIONS

Shuitao Yang et al.; Optimization of Fundamental Frequency Modulation for Cascaded Multilevel Inverter Based Transformer-less UPFC; Sep. 14, 2014; 6 pages; Department of Electrical and Computer Engineering Michigan State University East Lansing, MI; USA.

*Primary Examiner* — Fred E Finch, III
*Assistant Examiner* — Demetries A Gibson
(74) *Attorney, Agent, or Firm* — Howard & Howard Attorneys PLLC

(57) ABSTRACT

A system and a method for optimizing fundamental frequency modulation in a cascaded multilevel inverter (CMI) are provided. The CMI includes at least a first H-bridge module and a second H-bridge module connected in series with the first H-bridge module. The first H-bridge module is operated according to a first duty cycle and the second H-bridge module is operated according to a second duty cycle. The first duty cycle is greater than the second duty cycle. The first and second H-bridge modules are controlled utilizing fundamental frequency modulation. A portion of the first duty cycle is transferred to the second duty cycle thereby optimizing fundamental frequency modulation by at least improving power sharing between the first and second H-bridge modules and improving equalization of DC capacitor currents and voltage ripples while maintaining the same fundamental modulation to the output voltage waveform.

17 Claims, 8 Drawing Sheets

(56) References Cited

U.S. PATENT DOCUMENTS

| | | | |
|---|---|---|---|
| 6,697,271 B2* | 2/2004 | Corzine | H02M 7/487 363/41 |
| 7,230,837 B1* | 6/2007 | Huang | H02M 7/49 327/175 |
| 7,808,125 B1* | 10/2010 | Sachdeva | H02M 7/49 307/30 |
| 8,982,593 B2* | 3/2015 | Nondahl | H02M 1/12 363/36 |
| 9,473,042 B1* | 10/2016 | Chu | H02M 7/44 |
| 2005/0275404 A1* | 12/2005 | Sabate | G01R 33/3852 324/322 |
| 2006/0114623 A1* | 6/2006 | Domoto | G01R 33/3852 361/18 |
| 2009/0102436 A1* | 4/2009 | Escobar Valderrama | H02J 3/1857 323/207 |
| 2012/0007571 A1* | 1/2012 | Huisman | G01R 33/3852 323/271 |
| 2012/0068647 A1* | 3/2012 | Kawakami | H02P 6/14 318/400.29 |
| 2012/0092906 A1* | 4/2012 | Hasler | H02J 3/1857 363/39 |
| 2012/0163044 A1* | 6/2012 | Mayor Miguel | H02M 1/12 363/37 |
| 2015/0333612 A1* | 11/2015 | Hasler | H02M 1/12 363/39 |

* cited by examiner

| System Parameters | Symbol | Value |
|---|---|---|
| Nominal grid voltage | $V_{s0}$ | 13.8 kV |
| Nominal voltage for series CMI | $V_c$ | 6.9 kV |
| Nominal voltage for shunt CMI | $V_p$ | 13.8 kV |
| Nominal current for series CMI | $I_c$ | 100 A |
| Nominal current for shunt CMI | $I_p$ | 50 A |
| Nominal dc voltage for each H-bridge | $V_{dc}$ | 600 V |
| No. of H-bridges for series CMI | $N_{se}$ | 10 |
| No. of H-bridges for shunt CMI | $N_{sh}$ | 20 |

FIG. 8C

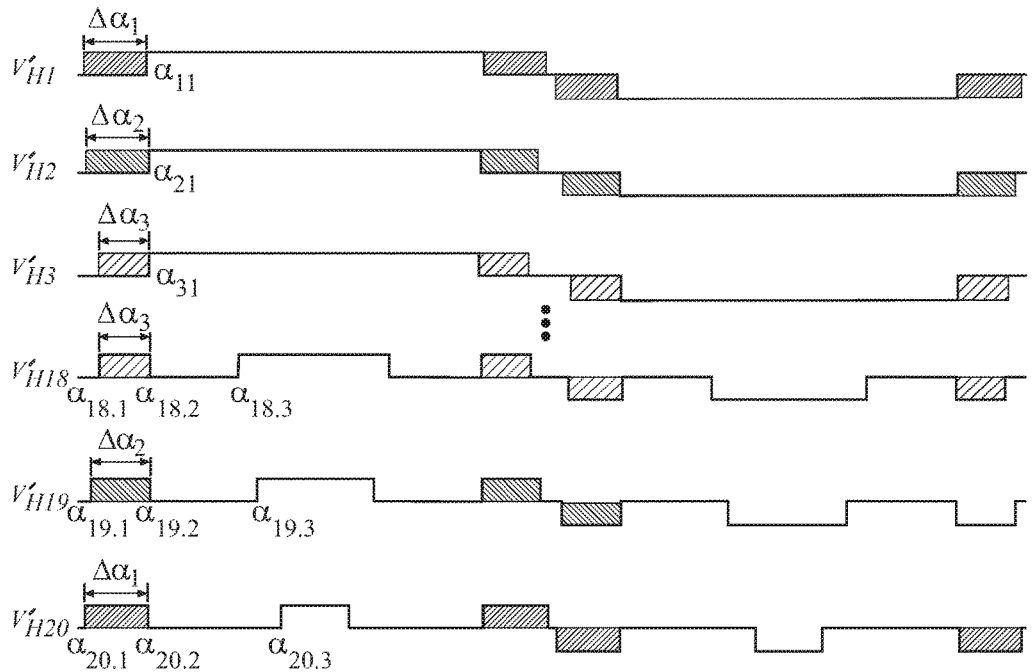

FIG. 9

| Module No. | Traditional FM | | Proposed FFM | |
|---|---|---|---|---|
| H1 | $\alpha_1$ | 0.0276 | $\alpha_{1,1}$ | 0.5262 |
| H2 | $\alpha_2$ | 0.0745 | $\alpha_{2,1}$ | 0.5241 |
| H3 | $\alpha_3$ | 0.1244 | $\alpha_{3,1}$ | 0.5229 |
| H4 | $\alpha_4$ | 0.1828 | $\alpha_{4,4}$ | 0.5271 |
| H5 | $\alpha_5$ | 0.2194 | $\alpha_{5,1}$ | 0.5206 |
| H6 | $\alpha_6$ | 0.2657 | $\alpha_{6,1}$ | 0.5109 |
| H7 | $\alpha_7$ | 0.3380 | $\alpha_{7,1}$ | 0.5258 |
| H8 | $\alpha_8$ | 0.3952 | $\alpha_{8,1}$ | 0.5359 |
| H9 | $\alpha_9$ | 0.4438 | $\alpha_{9,1}$ | 0.5302 |
| H10 | $\alpha_{10}$ | 0.4947 | $\alpha_{10,1}$ | 0.5239 |
| H11 | $\alpha_{11}$ | 0.5535 | $\alpha_{11,1}, \alpha_{11,2}, \alpha_{11,3}$ | 0.4947, 0.5239, 0.5535 |
| H12 | $\alpha_{12}$ | 0.6213 | $\alpha_{12,1}, \alpha_{12,2}, \alpha_{12,3}$ | 0.4438, 0.5302, 0.6213 |
| H13 | $\alpha_{13}$ | 0.6897 | $\alpha_{11,1}, \alpha_{11,2}, \alpha_{11,3}$ | 0.3952, 0.5359, 0.6897 |
| H14 | $\alpha_{14}$ | 0.7373 | $\alpha_{12,1}, \alpha_{12,2}, \alpha_{12,3}$ | 0.3380, 0.5258, 0.7373 |
| H15 | $\alpha_{15}$ | 0.7972 | $\alpha_{11,1}, \alpha_{11,2}, \alpha_{11,3}$ | 0.2657, 0.5109, 0.7972 |
| H16 | $\alpha_{16}$ | 0.8900 | $\alpha_{12,1}, \alpha_{12,2}, \alpha_{12,3}$ | 0.2194, 0.5206, 0.8900 |
| H17 | $\alpha_{17}$ | 0.9689 | $\alpha_{11,1}, \alpha_{11,2}, \alpha_{11,3}$ | 0.1828, 0.5271, 0.9689 |
| H18 | $\alpha_{18}$ | 1.0649 | $\alpha_{12,1}, \alpha_{12,2}, \alpha_{12,3}$ | 0.1244, 0.5229, 1.0649 |
| H19 | $\alpha_{19}$ | 1.1849 | $\alpha_{11,1}, \alpha_{11,2}, \alpha_{11,3}$ | 0.0745, 0.5241, 1.1849 |
| H20 | $\alpha_{20}$ | 1.3550 | $\alpha_{12,1}, \alpha_{12,2}, \alpha_{12,3}$ | 0.0276, 0.5262, 1.3550 | ns
SYSTEM AND METHOD FOR OPTIMIZING FUNDAMENTAL FREQUENCY MODULATION FOR A CASCADED MULTILEVEL INVERTER

CROSS-REFERENCE TO RELATED APPLICATION

The subject application claims the benefit of U.S. provisional patent application No. 62/185,099, filed on Jun. 26, 2015, the entire disclosure of which is hereby incorporated by reference in its entirety.

GOVERNMENT LICENSE RIGHTS

This invention was made with government support under DE-AR0000222 awarded by the U.S. Department of Energy. The government has certain rights in the invention.

FIELD OF THE DISCLOSURE

The present disclosure generally relates to systems and methods for optimizing fundamental frequency modulation (FFM), and more specifically, optimization of FFM for a cascaded multilevel inverter (CMI).

BACKGROUND

In recent years, the CMIs have been widely used in flexible AC transmission systems (FACTS) such as static synchronous series compensators (SSSC), dynamic voltage restorers (DVR), static synchronous compensators (STATCOM), and transformer-less unified power flow controllers (UPFC).

The CMIs are controlled by modulation. Modulation for the CMIs can be accomplished by either (1) fundamental frequency modulation (FFM) or (2) high-frequency pulse width modulation (PWM). Fundamental frequency modulation has much lower switching loss compared to the high-frequency PWM. As such, FFM is attractive for transmission-level UPFCs and other high-voltage and high-power applications.

However, one main drawback of traditional FFM is the unequal active/reactive power distribution among the H-bridge modules due to unequal pulse-width of output voltages. Such unequal distribution causes each H-bridge module to exhibit different DC capacitor currents and DC-link ripples. Hence, utilization of DC-link capacitors with traditional FFM is ineffective. This leads to either excessive voltage stress across insulated-gate bipolar transistors (IGBTs) or over-rated capacitor design in the H-bridge modules.

With traditional FFM, some H-bridge modules have greater duty cycles than others. The H-bridge modules with greater duty cycles have higher DC capacitor current and voltage ripples. One way to withstand higher capacitor currents and reduce the voltage ripples is to increase the DC-link capacitance for these H-bridge modules. However, increasing the DC-link capacitance is not cost-effective and is against modular design principles, in which all the H-bridge modules are expected to have the same type of capacitors having the same capacitance.

SUMMARY AND ADVANTAGES

One embodiment of a system is provided. The system includes a CMI comprising at least a first H-bridge module and a second H-bridge module. The first H-bridge module is operable according to a first duty cycle and the second H-bridge module is operable according to a second duty cycle. The first duty cycle is greater than the second duty cycle. The system includes a controller configured to control the first and second H-bridge modules utilizing fundamental frequency modulation. The controller is configured to transfer a portion of the first duty cycle to the second duty cycle for optimizing fundamental frequency modulation.

One embodiment of a method of optimizing fundamental frequency modulation in the CMI includes operating the first H-bridge module according to the first duty cycle, operating the second H-bridge module according to the second duty cycle and with the first duty cycle being greater than the second duty cycle, controlling the first and second H-bridge modules with the controller utilizing fundamental frequency modulation, and transferring the portion of the first duty cycle to the second duty cycle.

One embodiment of a controller-implemented method for optimizing fundamental frequency modulation in a cascaded multilevel inverter (CMI) is provided. The CMI comprises at least a first H-bridge module operable according to a first duty cycle and a second H-bridge module operable according to a second duty cycle being less than the first duty cycle. Each of the first and second duty cycles comprises a period. The method comprises shifting, with the controller, a portion of the first duty cycle to the second duty cycle by reducing activity of the first H-bridge module during the period of the first duty cycle for a predetermined duration and by increasing activity of the second H-bridge module during the period of the second duty cycle for the predetermined duration.

Compared to traditional FFM techniques, the system and method provide an optimized FFM technique improving power sharing between the first and second H-bridge modules. This further improves equalization of DC capacitor currents and voltage ripples for the H-bridge modules. The system and method further reduce excessive voltage stress on insulated-gate bipolar transistors (IGBTs) and eliminates the need for over-sized capacitors in the H-bridge modules. The system and method are highly efficient and exhibit low total harmonic distortion (THD) of output voltage. The estimated efficiency of the system and method is greater than 99.2% under nominal operation conditions. The system is further a modular structure that is lightweight, reliable, low cost, and exhibits fast dynamic response. The proposed system and method are versatile and may be implemented for CMI based transformerless UPFC systems, or other applications, such as CMI based static synchronous compensators (STATCOM), static synchronous series compensators (SSSC), motor drives, and the like.

BRIEF DESCRIPTION OF THE DRAWINGS

Advantages of the present disclosure will be readily appreciated as the same becomes better understood by reference to the following detailed description when considered in connection with the accompanying drawings.

FIG. 8C is a pulse diagram illustrating output voltages for the H-bridges of the shunt CMI in FIG. 1 resulting from fundamental frequency modulation optimized by the method.

FIG. 9 is a table comparing switching angles between fundamental frequency modulation of FIG. 6 and the optimized fundamental frequency modulation of FIG. 8C.

DETAILED DESCRIPTION

I. System Overview

Referring to the Figures, wherein like numerals indicate like or corresponding parts throughout the several views, aspects relating to the system and method for optimizing FFM are shown throughout.

Figure 1:
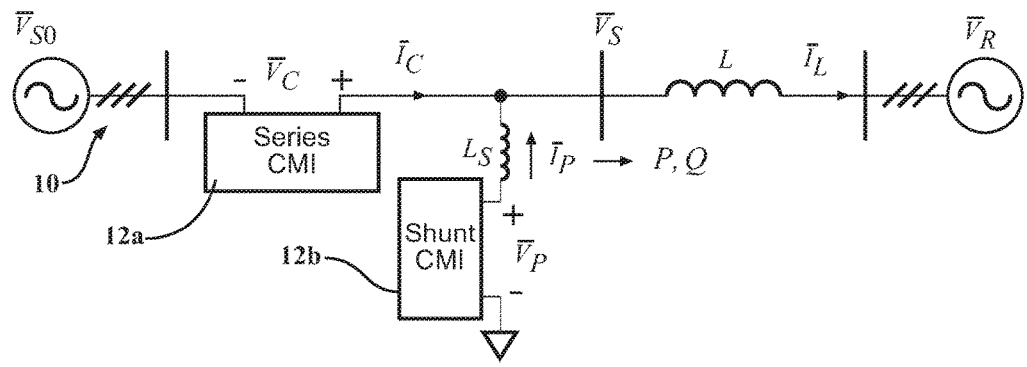
FIG. 1 is a circuit diagram of a transformerless UPFC system using series and shunt CMIs according to one embodiment.

FIG. 1 illustrates a transformerless UPFC 10, which is based on a configuration of two CMIs 12. One CMI 12a is a series CMI and another CMI 12b is a shunt CMI.

Figure 2:
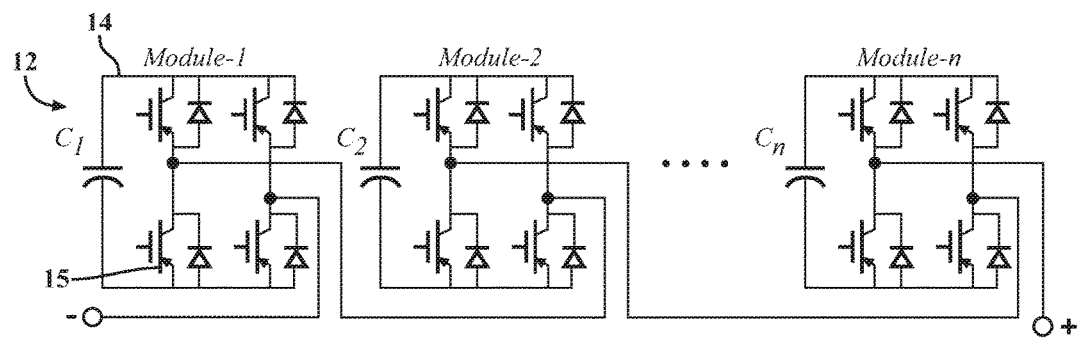
FIG. 2 is a circuit diagram of H-bridge modules of the series or shunt CMI in FIG. 1.

FIG. 2 illustrates one phase of one of the CMIs 12a, 12b. As shown in FIG. 2, the CMIs 12a, 12b include any suitable number of H-bridge modules 14. The H-bridge modules 14 each include a plurality of IGBTs 15 connected in an H-bridge configuration and a capacitor $C_1, C_2, \ldots C_n$ connected to each H-bridge module 14 and/or each of the IGBTs 15 for receiving DC current and DC voltage and storing charge. In FIG. 2, for example, each H-bridge module 14 includes four IGBTs 15. Each H-bridge module 14 may include any suitable number of IGBTs 15.

Figure 3:
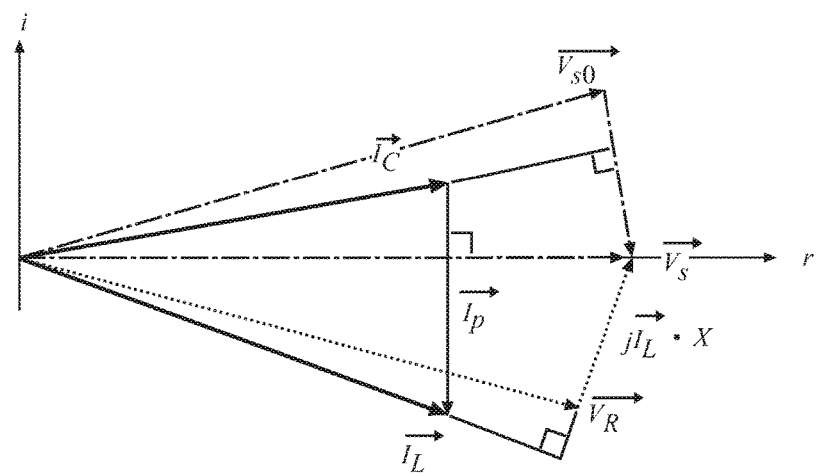
FIG. 3 is a phasor diagram of the transformerless UPFC system in FIG. 1.

The H-bridge modules 14 are connected in series, which offers advantages such as modularity, flexibility and lower component count in comparison with other multilevel topologies. In one embodiment, the UPFC 10 includes 90 H-bridge modules total (e.g., 30 series H-bridge modules and 60 shunt H-bridge modules). FIG. 3 illustrates a phasor diagram for the transformerless UPFC system 10.

Figures 4, 5:
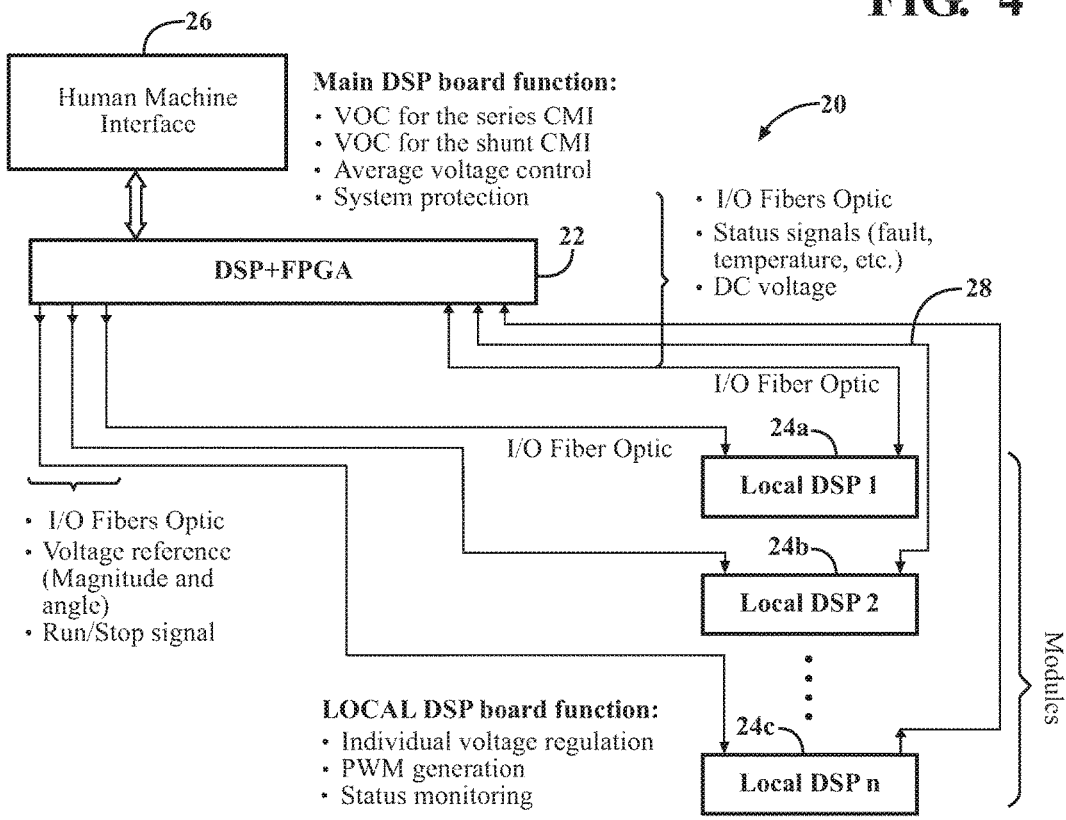
FIG. 4 is a system diagram of a control system for controlling the UPFC of FIG. 1 according to one embodiment.
FIG. 5 is a table of parameters of the UPFC in FIG. 1 according to one embodiment of the system and method.

FIG. 4 illustrates a control system 20 for controlling the UPFC 10 according to one embodiment. The control system 20 includes a main control board 22 for system level control and at least one local control board 24, 24b, 24c for module level control. The main control board 22 includes a floating-point DSP (digital signal processor) and FPGA (field-programmable gate array). The DSP and FPGA regulate current, control outer-loop DC-link voltage, provide system level protection, and provide communications with the local control board(s) 24, 24b, 24c and a Human Machine Interface 26 (HMI). Each local control board 24, 24b, 24c includes a DSP. The local control boards 24, 24b, 24c collectively include the H-bridge modules 14.

The main control board 22, according to one embodiment, includes 104 pairs (13×8) of fiber-optic transmitters and receivers 28, which provide sufficient channels to communicate with the 90 H-bridge modules 14.

The local control boards 24, 24b, 24c implement inner-loop DC-link voltage regulation, fundamental switching signals generation, local protection, and communication with the main control board 22. Universal asynchronous receiver transmitter (UART) communication may be used between the main control board 22 and local control board(s) 24, 24b, 24c.

In one embodiment, the UPFC 10 is a 2-MVA transformerless UPFC. FIG. 5 provides a table of system parameters of such improved 2-MVA transformerless UPFC 10. Those skilled in the art appreciate that the system parameters may deviate from those shown in FIG. 5 for different implementations.

One embodiment of a method for optimization of FFM for the UPFC 10 is provided. The method is implemented for a UPFC 10 including at least one CMI 12 comprising at least a first H-bridge module 14a and a second H-bridge module 14b connected in series with the first H-bridge module 14a. The first H-bridge module 14a is operable according to a first duty cycle and the second H-bridge module 14b is operable according to a second duty cycle and with the first duty cycle being greater than the second duty cycle. The method includes the step of controlling the first and second H-bridge modules 14a, 14b utilizing fundamental frequency modulation. The method further includes transferring a portion of the first duty cycle to the second duty cycle for optimizing fundamental frequency modulation.

Additional aspects of the system and method are described in detail throughout. Furthermore, the proposed method may be utilized to optimize FFM in other applications besides transformerless UPFCs. For example, the proposed FFM may be utilized with CMIs based STATCOM, SSSC, motor drives, and the like.

II. Investigation of Voltage Total Harmonic Distortion (THD) Versus the Number of H-Bridge Modules Certain aspects and observations relating to the system and method described herein are exemplified by investigation and comparison to traditional FFM operation and results. Thus, one of the deficiencies in traditional FFM is demonstrated.

Figure 6:
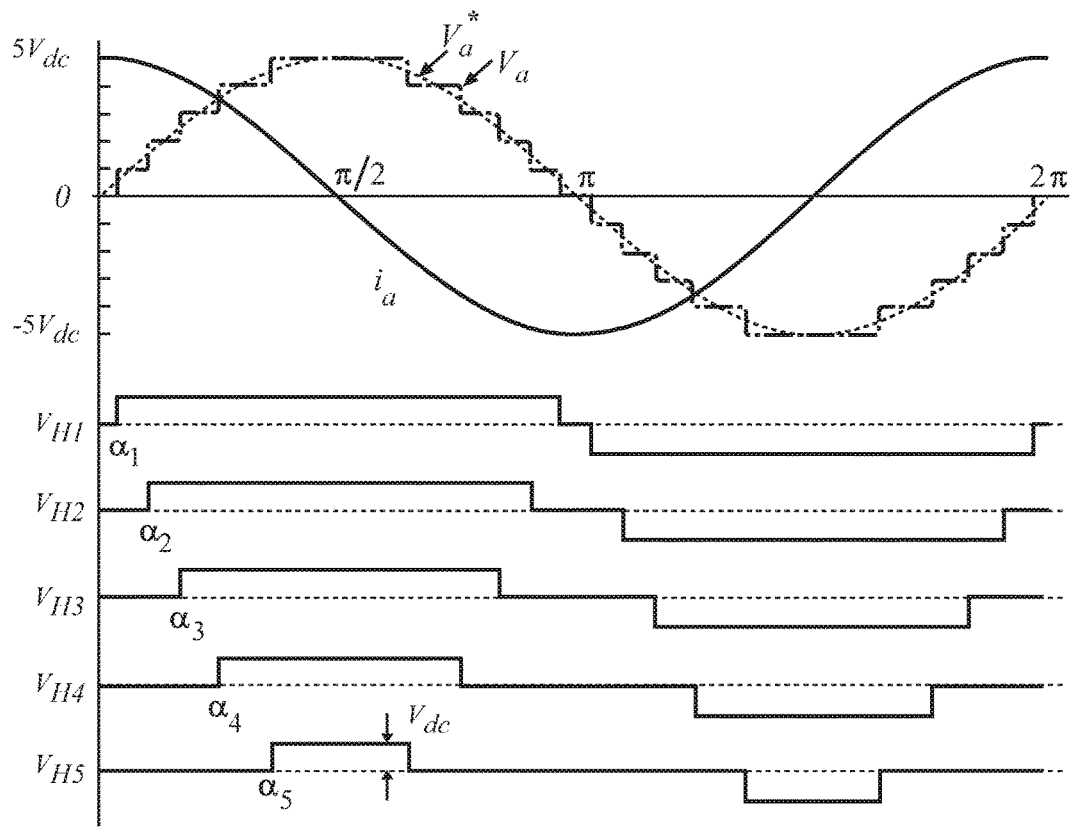
FIG. 6 is a diagram illustrating principle operation of fundamental frequency modulation according to one conventional method.

FIG. 6 illustrates the operation principles of traditional FFM, where phase a output voltage of an 11-level CMI 12 is shown, as an example. Each of five H-bridge modules 14 generates a quasi-square wave, $V_{H1}$, $V_{H1}$, . . . , $V_{H5}$ to synthesize a stair-case voltage waveform Va. Each H-bridge has an identical DC-link voltage $V_{dc}$ for modular design considerations. In FIG. 6, the duty cycles of the H-bridge modules 14 exhibit output voltages having unequal pulse-widths. This causes unequal active/reactive power distribution among H-bridge modules 14.

Figure 7:
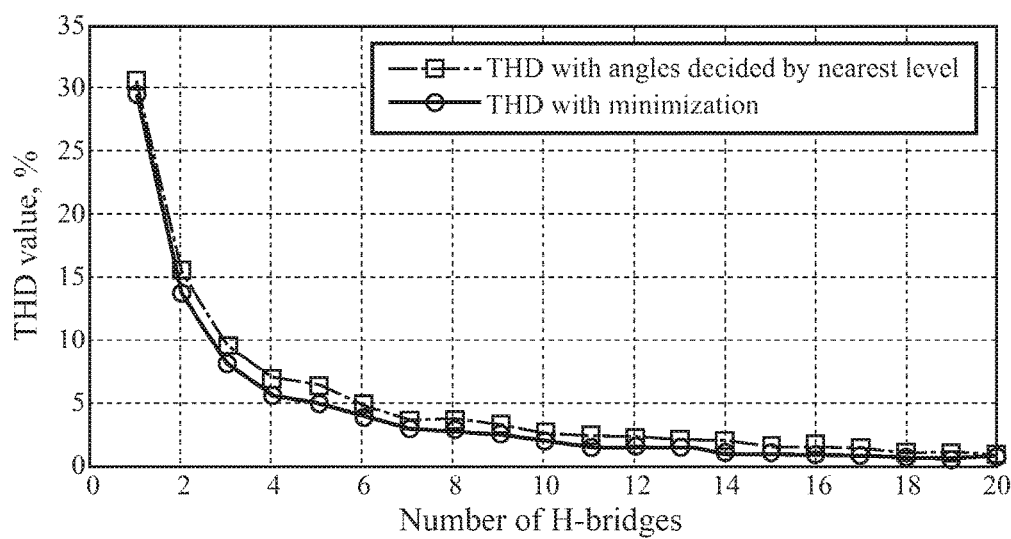
FIG. 7 is a chart comparing total harmonic distortion (THD) versus the number of H-bridge modules in view of fundamental frequency modulation of FIG. 6.

FIG. 7 illustrates a Fourier series expansion of the CMI 12 output voltage. The Fourier series expansion of the output voltage of the CMI 12, which is expressed as follows:

$$V_a(\omega t) = \sum_{n=1}^{\infty} V_{an} \cdot \sin(n\omega t), \quad [1]$$

$$\text{where } V_{an} = \begin{cases} \frac{4}{n\pi} \sum_{k=1}^{s} V_{dc} \cdot \cos(na_k), & \text{for odd } n \\ 0, & \text{for even } n \end{cases}$$

In equation [1], n is a harmonic number, s is a number of H-bridge modules 14, and $a_k$ represents the switching angle for the $k^{th}$ H-bridge module.

Selected harmonic elimination (SHE) or THD minimization methods may be utilized to decide the switching angles. In the example described herein, a THD minimization method is adopted. For a three-phase system, the THD of line voltage is generally of more significance than the phase voltage. Thus, triplen harmonics are ignored for the voltage THD calculation. The voltage THD calculation is expressed as follows:

$$THD = \frac{1}{V_{a1}} \sqrt{\sum_{n=5,7,11,\dots}^{\infty} V_{an}^2} \quad [2]$$

Equation [2] provides an objective function to be minimized, with the following two constraints:

$$0 < a_1 < a_2 < a_3 \dots < a_s < \frac{\pi}{2} \quad [3]$$

$$V_{a1} = \frac{4}{\pi} \sum_{k=1}^{s} V_{dc} \cdot \cos(a_k) \quad [4]$$

Equation [3] indicates that the switching angles from the first H-bridge module (H1) to the last H-bridge module (H20) gradually increase, whereas the corresponding duty cycles (pulse widths) of the output voltage gradually decreases.

In equation [4], $V_{a1}$ is the desired fundamental voltage, which is equal to the reference voltage such that $V_{a1}=V_a^*$. The minimum THD can be obtained from the above two constraints in equations [3] and [4].

FIG. 7 further compares for each H-bridge module 14 the line voltage THD with angles decided by the nearest level and the THD with minimization. FIG. 7 clearly shows that the THD decreases as the number of H-bridge modules 14, s, increases. As shown in FIG. 7, the minimum THD value is less than 1% when s≥15. No additional filters are required to achieve such a low minimum THD value.

The weighted total harmonic distortion (WTHD) may be preferred to the THD since WTHD predicts the current distortion, which may be of most interest in many applications. In such instances, the objective function in equation [2] may be expressed as follows:

$$WTHD = \frac{1}{V_{a1}} \sqrt{\sum_{n=5,7,11,\dots}^{\infty} (V_{an}^2/n)^2} \quad [5]$$

III. Method of Optimization of FFM for Equalization of the H-Bridge

A. Problems with Traditional FFM

As mentioned and as shown in FIG. 6, traditional FFM causes unequal power distribution due to unequal duty cycles. For traditional FFM, unequal active/reactive power distributions are evident by fundamental output voltage differences for each of the H-bridge modules 14. This causes unequal DC capacitor currents and capacitor voltage ripples, and aggravates the problem of DC-link voltage imbalance. Furthermore, increasing the DC-link capacitance is not a feasible solution from a modular design point of view because all H-bridge modules 14 are expected to be identical.

When FFM is applied to the series or shunt CMIs 12 a, 12 b of the UPFC system 10, the peak-to-peak voltage ripple of the DC capacitor of one H-bridge module can be expressed as:

$$\Delta V_{PP} = (\int i_c dt)/C_{dc} \quad [6]$$

In Equation [6], $i_c$, is the DC-link capacitor current, which is equal to output current when the H-bridge outputs +1 state, equal to minus output current when the H-bridge outputs −1 state, and equal to zero when H-bridge outputs zero state. The CMIs 12 a, 12 b provide or absorb reactive power due to the use of floating DC capacitors. Thus, as shown in FIG. 6, the CMI 12 output current leads or lags the output voltage by 90°. Due to the symmetry of the output voltage, the peak-to-peak capacitor voltage ripple of the $k^{th}$ H-bridge module is:

$$\Delta V_{PP\_K} = \frac{1}{\omega C_{dc}} \int_{a_k}^{\pi/2} I_o \cos(\theta) d\theta = I_o \cdot \frac{1-\sin(a_k)}{\omega C_{dc}} \quad [7]$$

In equation [7], $I_O$ is the given output current amplitude, ω is the angular frequency, and $C_{dc}$ is the capacitance. With these variables, the voltage ripple of DC capacitor is decided by the switching angle $a_k$. If the switching angle $a_k$ decreases, the duty cycle increases thereby producing greater capacitor voltage ripples.

Figure 8A:
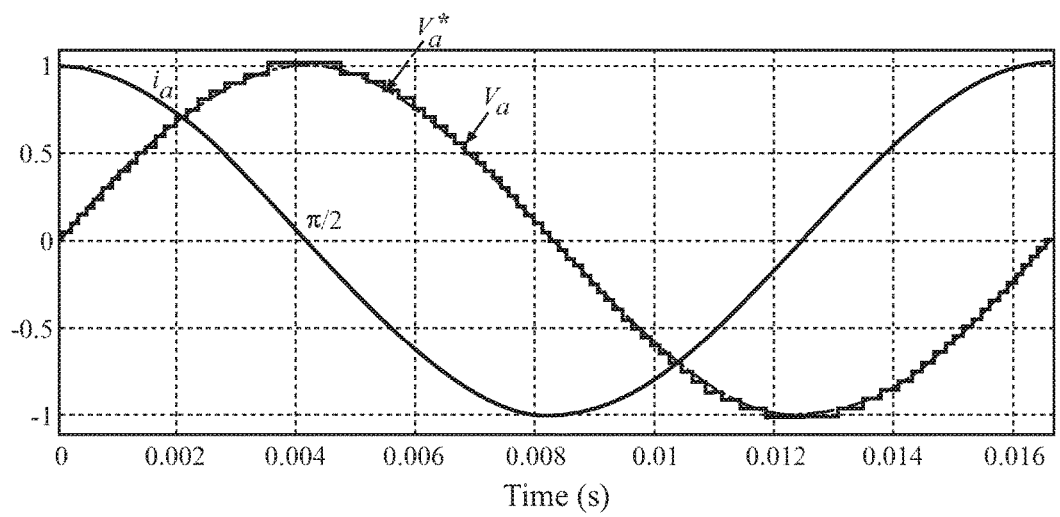
FIG. 8A is a chart illustrating output voltage and current for the shunt CMI in FIG. 1.
Figure 8B:
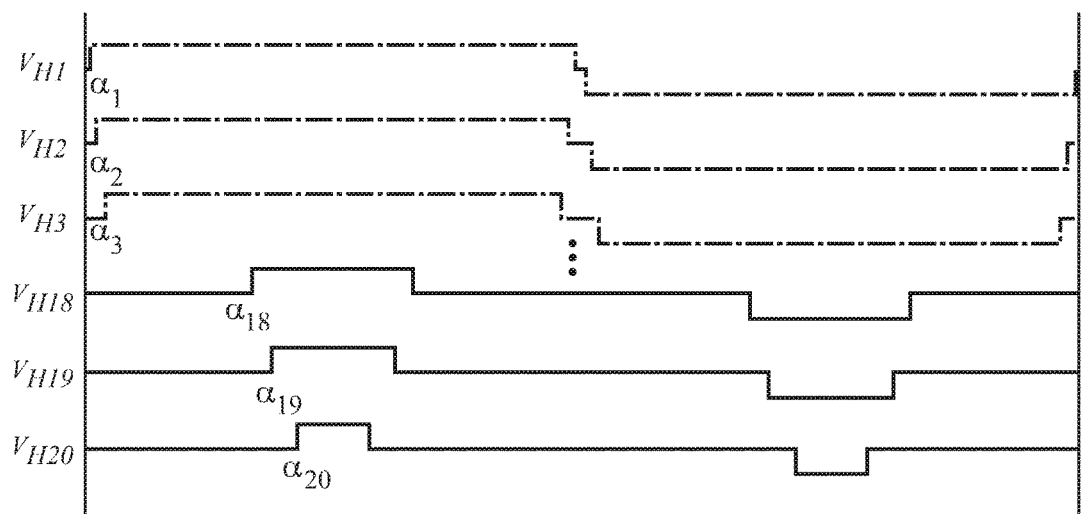
FIG. 8B is a pulse diagram illustrating output voltages for the H-bridges of the shunt CMI in FIG. 1 resulting from the fundamental frequency modulation of FIG. 6.

FIGS. 8A-8B illustrate optimization of traditional FFM according to one embodiment. FIG. 8A illustrates the output voltage and current for the shunt CMI 12 b, which consists of total 20 H-bridge modules 14 generating stair-case waveforms with 41 total levels. Given the switching angle constraints in equation [3], the duty cycles from module H1 to module H20 gradually decrease.

FIG. 8B illustrates an example of output voltages with traditional FFM. As shown in FIG. 8B, the H-bridge modules 14 are divided into two groups, (H1-H10) and (H11-H20). The output voltages of the first group (H1-H10) have greater pulse widths (duty cycles) compared to the pulse widths of the second group (H11-H20). For simplicity, only modules (H1-H3) from the first group and modules (H18-H20) from the second group are illustrated in FIG. 8B. H-bridge module H1 has the smallest switching angle $a_1$, and therefore, the largest duty cycle (i.e., close to 100%). In contrast, module H20 has the largest switching angle $a_{20}$, and therefore, the smallest duty cycle (i.e., close to zero).

According to equation [7] and FIGS. 8A and 8B, when traditional FFM is applied for the shunt CMI 12 $b$, the smallest duty cycle is close to zero, which nearly leads to zero voltage ripple. On the other hand, the largest duty cycle is approximately 100%, which leads to maximum voltage ripple. Therefore, for traditional FFM, DC capacitor currents and voltage ripples are significantly different among all the H-bridge modules 14. High capacitor voltage ripple increases the stress for IGBTs 15, while the high capacitor current is harmful to the lifetime of the capacitors.

B. Proposed FFM for Equalization of DC Capacitor Voltage Ripples

Once the output voltage of the CMI 12 is decided, the total DC-link capacitor currents may be decided accordingly. Eliminating or decreasing the total capacitor currents changes the output voltage. According to one embodiment, a switching frequency with three times the fundamental frequency is utilized to equalize the fundamental output voltage of the H-bridge modules 14, thereby helping the DC-link voltage balancing control. Increasing the number of switching angles increases the degrees of freedom, which potentially optimizes control performance. Improved equalization of fundamental output voltage may be achieved using the switching frequency that is three times the fundamental frequency.

Equalizing fundamental output voltages of the H-bridge modules 14 while simultaneously keeping the THD of output voltage as low as possible is important. Since the unequal DC capacitor currents and voltage ripples are caused by unequal duty cycles, the method proposes moving part of the duty cycle from the H-bridge module(s) 14 with larger duty cycles (e.g., module H1 to H10) to H-bridge module(s) 14 with smaller duty cycles (e.g., module H11 to H20).

FIG. 8C illustrates output voltages with the FFM proposed by the subject invention wherein part of the duty cycle from the H-bridge modules 14 with larger duty cycles is moved to H-bridge modules 14 with smaller duty cycles. FIG. 8C shows that duty cycle portion $\Delta a_k$ is cut out from H-bridge k, then moved to another H-bridge s+1-k, where k=1, 2, . . . , s/2. For example, duty cycle $\Delta a_1$ moves from module H1 (largest duty cycle) to module H20 (smallest duty cycle). Similarly, duty cycle $\Delta a_2$ moves from module H2 (second to largest duty cycle) to module H19 (second to smallest duty cycle), and so on.

The duty cycle portion $\Delta a_k$ may be transferred between different modules according to various other methods other than from largest to smallest duty cycle and so on. For example, the duty cycle portion $\Delta a_k$ may be transferred from a single large duty cycle to many smaller duty cycles. The system 10 may utilize any suitable controller and algorithms to compute duty cycles of the modules and the duty cycle portion $\Delta a_k$.

With this method, each module of first group outputs a relatively smaller duty cycle. However, one pulse (1×) is maintained for each half fundamental period in the duty cycle. On the other hand, each module of second group outputs a relatively larger duty cycle. However, the number of pulses in each half fundamental period in the duty cycle changes from one to three (3×).

The duty cycle portion $\Delta a_k$ provides an extra degree of control freedom. For example, the duty cycle portion $\Delta a_k$ may be used to equalize duty cycles, DC capacitor currents, and/or DC capacitor voltage ripples among H-bridge modules 14.

As described herein, for example, the DC capacitor voltage ripple equalization is chosen as the optimization target, which yields the following:

$$\frac{1}{\omega C_{dc}} \int_{a_k+\Delta a_k}^{\pi/2} I_o \cos(\theta) d\theta = \frac{1}{\omega C_{dc}} \left( \int_{a_k}^{\Delta a_k} I_o \cos(\theta) d\theta + \int_{a_{s+1-k}}^{\pi/2} I_o \cos(\theta) d\theta \right) \quad [8]$$

In equation [8], k=1, 2, . . . (s/2). From equation [8], $\Delta a_k$ can be derived as follows:

$$\Delta a_k = \arcsin\left(\frac{\sin(a_k) + \sin(a_{s+1-k})}{2}\right) - a_k \quad [9]$$

In equation [9], $a_k < a_{s+1-k}$, due to the constraint in equation [3]. Equation [9] provides one possible solution to calculate the transferred pulse portion. Those skilled in the art appreciate that other solutions not specifically described herein may also be utilized to calculate the transferred pulse portion.

In the traditional FFM without equalization, the switching angle for each of the H-bridge modules 14 is $a_k$, where k=1, 2, . . . , s. In the proposed FFM with equalization as given in [9], the switching angles become:

$$a_{k.1} \begin{cases} a_k + \Delta a_k, & k \leq s/2 \\ a_{s+1-k}, & k > s/2 \end{cases} \quad [10]$$

$$a_{k.2} \begin{cases} NA, & k \leq s/2 \\ a_{(s+1-k)} + \Delta a_{(s+1-k)}, & k > s/2 \end{cases}$$

$$a_{k.3} \begin{cases} NA, & k \leq s/2 \\ a_k, & k > s/2 \end{cases}$$

In equation [10], s, is the number of H-bridge modules 14, which is equal to 20 for the shunt CMI 12 $b$ in this example. FIG. 9 illustrates a table comparing switching angles between traditional FFM and the proposed FFM for the 20 H-bridge modules 14 of the shunt CMI 12 $b$. In this case, modulation index MI=1, is defined as:

$$MI = \frac{V_a^*}{S \cdot V_{dc}} = \frac{V_{a1}}{S \cdot V_{dc}} \quad [11]$$

Figure 10A:
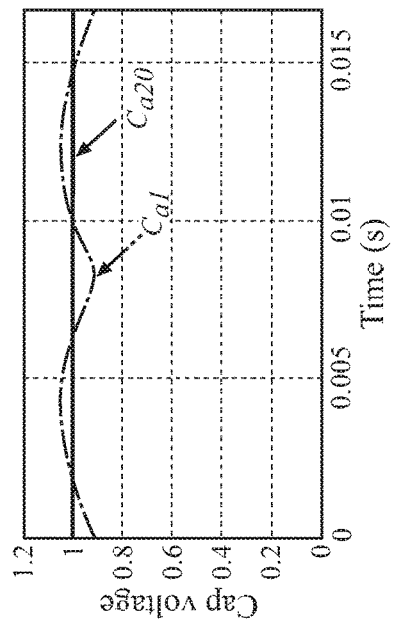
FIG. 10A is a chart illustrating DC capacitor currents of H-bridge modules H1 and H20 resulting from fundamental frequency modulation of FIG. 8B.
Figure 10B:
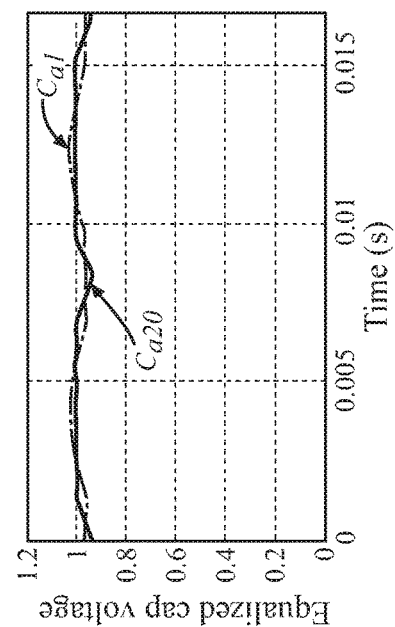
FIG. 10B is a chart illustrating DC capacitor voltages of H-bridge modules H1 and H20 resulting from fundamental frequency modulation of FIG. 8B.

FIG. 10A illustrates the DC capacitor currents of H-bridge modules H1 and H20 before equalization. FIG. 10B illustrates the DC capacitor voltages of H-bridge modules H1 and H20 before equalization. Thus, FIGS. 10A and 10B relate to conventional FFM techniques as implemented and shown in the example of FIG. 8B. Before equalization, the load current almost entirely passes through the DC capacitor of module H1 because of close to 100% duty cycle, as shown in FIG. 10A This causes a substantial capacitor voltage ripple as shown in FIG. 10B. Meanwhile, the DC capacitor of module H20 has less pronounced capacitor current and voltage ripples due to the very small duty cycle.

Figure 10C:
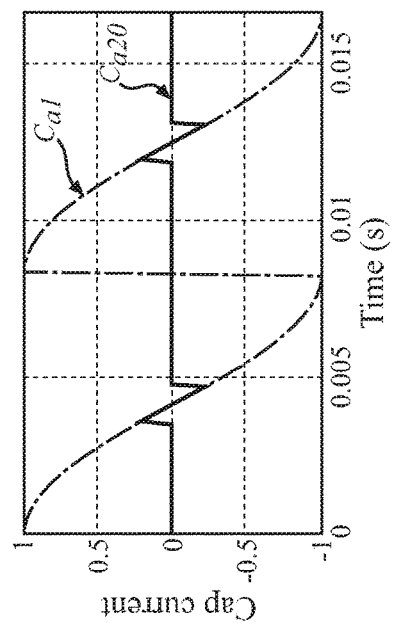
FIG. 10C is a chart illustrating equalized DC capacitor currents of H-bridge modules H1 and H20 resulting from fundamental frequency modulation optimized by the method according to one embodiment as shown in FIG. 8C.
Figure 10D:
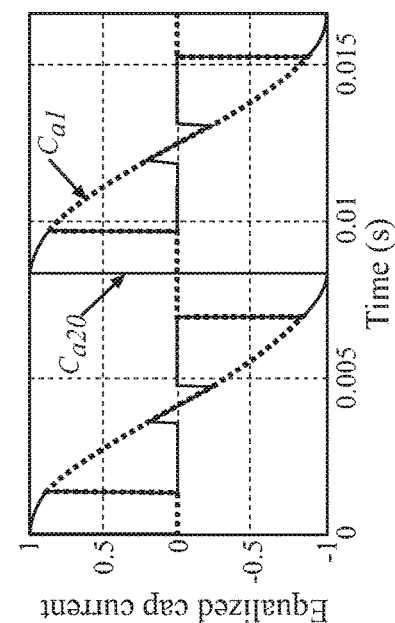
FIG. 10D is a chart illustrating equalized DC capacitor voltages of H-bridge modules H1 and H20 resulting from fundamental frequency modulation optimized by the method according to one embodiment as shown in FIG. 8C.

FIG. 10C illustrates the DC capacitor currents of H-bridge modules H1 and H20 after equalization. FIG. 10D illustrates the DC capacitor voltages of H-bridge modules H1 and H20 after equalization. Thus, FIGS. 10C and 10D relate to the proposed FFM techniques as implemented and shown in the example of FIG. 8C. To implement equalization in this example, part of the capacitor current is moved from module H1 to module H20 by moving part of duty cycle from H1 to H20, as shown in FIG. 10C. As a result, the capacitor voltage ripples of H-bridge modules H1 and H20 become more similar to one another, as shown in FIG. 10. This causes the capacitor voltage ripple in FIG. 10D to be less prominent than the capacitor voltage ripple in FIG. 10B. Again, this may require increasing switching frequency from 1× to 3× for module H20.

Figure 11A:
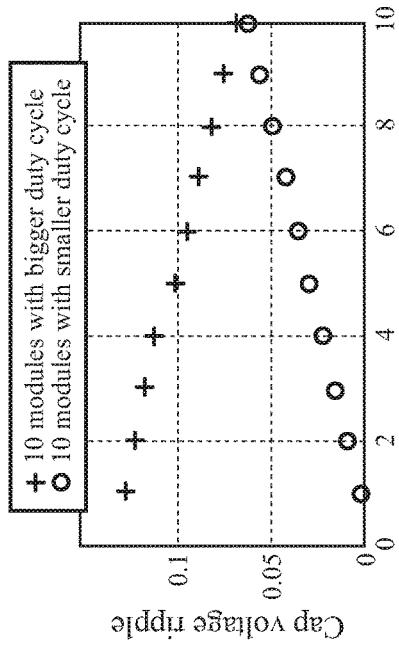
FIG. 11A is a chart illustrating DC capacitor currents for the 20 H-bridge modules in FIG. 9 resulting from fundamental frequency modulation of FIG. 8B.
Figure 11B:
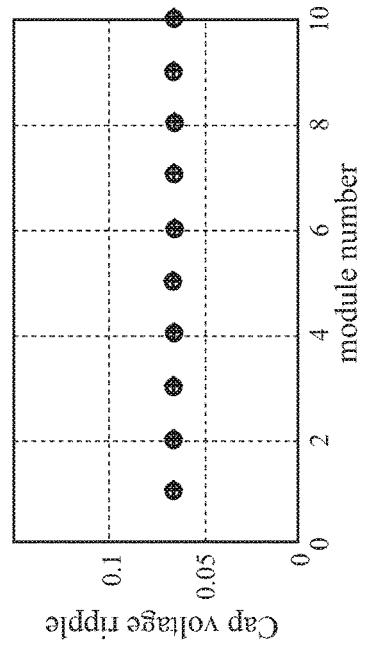
FIG. 11B is a chart illustrating DC capacitor voltages for the 20 H-bridge modules in FIG. 9 resulting from fundamental frequency modulation of FIG. 8B.

FIG. 11A illustrates the DC capacitor currents for 20 total H-bridge modules 14 before equalization. FIG. 11B illustrates the DC capacitor voltages for the 20 total H-bridge modules 14 before equalization. Thus, FIGS. 11A and 11B relate to conventional FFM techniques as implemented and shown in the example of FIG. 8B. As shown in FIG. 11B, before equalization, the capacitor voltage ripples are much different.

Figure 11C:
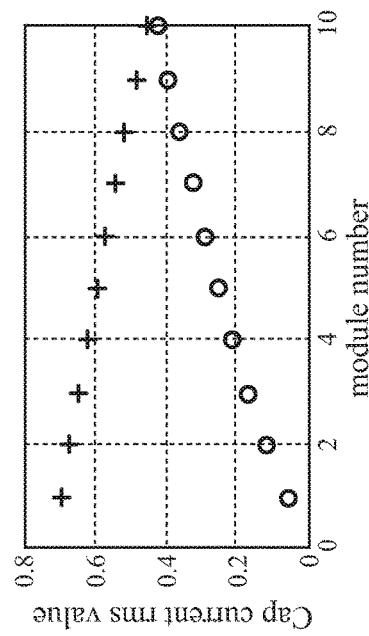
FIG. 11C is a chart illustrating equalized DC capacitor currents for the 20 H-bridge modules in FIG. 9 resulting from fundamental frequency modulation optimized by the method according to one embodiment as shown in FIG. 8C.
Figure 11D:
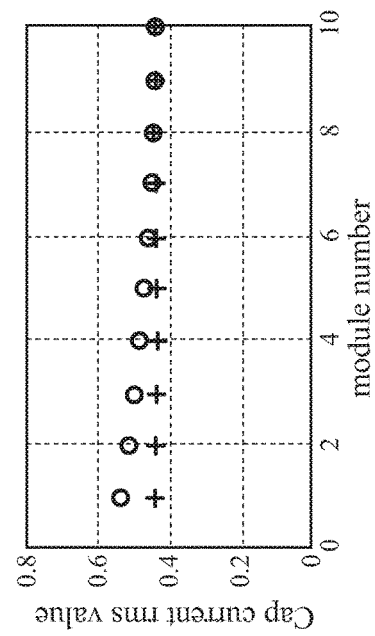
FIG. 11D is a chart illustrating equalized DC capacitor voltages for the 20 H-bridge modules in FIG. 9 resulting from fundamental frequency modulation optimized by the method according to one embodiment as shown in FIG. 8C.

FIG. 11C illustrates the DC capacitor currents for the 20 total H-bridge modules 14 after equalization. FIG. 11D illustrates the DC capacitor voltages for the 20 total H-bridge modules 14 after equalization. Thus, FIGS. 11C and 11D relate to the proposed FFM techniques as implemented and shown in the example of FIG. 8C. After equalization, the capacitor voltage ripples are the same, as shown in FIG. 11D. In this case, the capacitor current rms values are not equal, but are quite close to each other.

C. Regulation of H-Bridge DC-Link Voltage

In previous analysis, the CMI 12 output voltage leads or lags the output current by 90°, which means no active power flows from the AC side into DC capacitors. In practice, the DC capacitor voltage cannot be maintained due to the power loss of switching devices and capacitors. Therefore, each H-bridge module 14 of the CMI 12 is controlled to absorb small amounts of active power to maintain the desired DC-link voltage. The DC capacitor voltage balancing control for CMI 12 may adopt a hierarchical control structure. For example, such hierarchical control structure may comprise an outer control loop and an inner control loop. The outer loop regulates the overall active power flowing to all H-bridge modules 14, while the inner loop distributes power flowing into each individual H-bridge module.

Taking phase "a" of the shunt CMI 12 b, as an example, the active power flows from the AC side into DC capacitors can be expressed as:

$$P_a = V_d I_a \cdot \cos(\theta) \qquad [12]$$

As mentioned before, if the phase angle between the output voltage and current is 90°, then $P_a=0$. To absorb small amounts of active power to maintain the desired DC-link voltage, the outer control loop regulates the phase angle $\theta$ to be less than 90°, denoted as (90°−Δθ). The DC capacitor voltage may be balanced if:

$$P_a = V_d I_a \cdot \cos(90 - \Delta\theta) = V_d I_a \sin(\Delta\theta) = P_{loss} \qquad [13]$$

In equation [13], $P_{loss}$ is the total power loss of switching devices and capacitors of all the H-bridge modules 14 of each phase. With the outer control loop, the overall DC capacitor voltage is balanced if equation [13] is satisfied.

For individual H-bridge modules 14 having shifted phase angle Δθ, the capacitor charge over one fundamental period for traditional FFM is:

$$Q = \int i_c dt = \frac{2}{\omega} \cdot \int_{a_{k,1} - \Delta\theta}^{\pi - a_{k,1} - \Delta\theta} I_o \cos(\theta) d\theta \qquad [14]$$

$$= \frac{4}{\omega} \cdot I_o \cos(a_k) \sin(\Delta\theta)$$

In equation [14], $I_0$ is the load current amplitude. All the H-bridge modules 14 in the same phase share the same load current because the H-bridge modules 14 are connected in-series. Equation [14] indicates that the DC capacitor charge depends on not only the phase shift Δθ, but also on the switching angle (duty cycle) of the output voltage pulse. Equation [14] indicates that different active power flows to each H-bridge module 14 due to the unequal duty cycles among H-bridge modules 14.

With the proposed FFM, the capacitor charge over one fundamental period for a 1× pattern (k≤s/2) becomes:

$$Q = \int i_c dt \qquad [15]$$

$$= \frac{2}{\omega} \cdot \int_{a_{k,1} - \Delta\theta}^{\pi - a_{k,1} - \Delta\theta} I_o \cos(\theta) d\theta$$

$$= \frac{4}{\omega} \cdot I_o \cos(a_{k,1}) \sin(\Delta\theta)$$

With the proposed FFM, the capacitor charge over one fundamental period for a 3× pattern (k>s/2) becomes:

$$Q = \int i_c dt = \frac{2}{\omega} \cdot \left( \int_{a_{k,1} - \Delta\theta}^{a_{k,2} - \Delta\theta} I_o \cos(\theta) d\theta + \int_{a_{k,3} - \Delta\theta}^{\pi - a_{k,3} - \Delta\theta} I_o \cos(\theta) d\theta + \int_{\pi - a_{k,2} - \Delta\theta}^{\pi - a_{k,1} - \Delta\theta} I_o \cos(\theta) d\theta \right) = \qquad [16]$$

$$\frac{4}{\omega} \cdot I_o (\cos(a_{k,1}) - \cos(a_{k,2}) + \cos(a_{k,3})) \sin(\Delta\theta)$$

Figure 12:
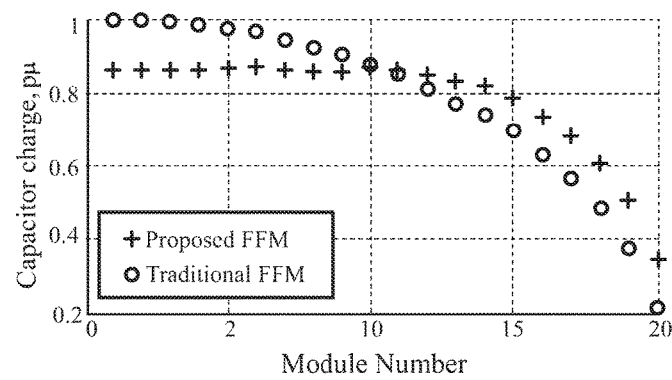
FIG. 12 is a chart comparing capacitor charges for the 20 H-bridge modules in FIG. 9 resulting from fundamental frequency modulation of FIG. 8B and fundamental frequency modulation optimized by the method according to one embodiment as shown in FIG. 8C.

Given the switching angles in FIG. 9 and equations [14]-[16], the capacitor charges for the 20 H-bridge modules with both traditional FFM and proposed FFM are compared in FIG. 12. FIG. 12 is a chart comparing capacitor charges for the 20 H-bridge modules in FIG. 9 resulting from the traditional fundamental frequency modulation of FIG. 8B and proposed fundamental frequency modulation optimized by the method according to one embodiment as shown in FIG. 8C. In traditional FFM, the capacitor charges from the AC side significantly vary from one another due to the different duty cycles (or switching angles). This is so even with the same phase angle Δθ. Meanwhile, in the proposed FFM, this problem is mitigated because the capacitor charges from the AC side are very similar for many of the H-bridge modules 14.

The equalization target for the angles in FIG. 9 is the capacitor voltage ripple. Therefore, the equalization target need only change to get more equalized capacitor charge among H-bridge modules 14.

Controlling the absorbed active power of individual H-bridge modules 14 may be accomplished according to various methods, such as regulation of the output voltage magnitude (equivalent of duty cycles here), regulation of phase current magnitude, and regulation of the phase angle between H-bridge modules 14. Individual DC capacitor voltage control is made easier with the proposed FFM regardless of which control method is utilized.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

The invention claimed is:

1. A system comprising:
a cascaded multilevel inverter (CMI) comprising a plurality of H-bridge modules including at least a first H-bridge module and a second H-bridge module and with the first H-bridge module being operable according to a first duty cycle and with the second H-bridge module being operable according to a second duty cycle and with the first duty cycle being greater than the second duty cycle; and
a controller configured to control the first and second H-bridge modules utilizing fundamental frequency modulation and to transfer a portion of the first duty cycle to the second duty cycle for optimizing fundamental frequency modulation by reducing activity of the first H-bridge module during a period of the first duty cycle for a predetermined duration and increasing activity of the second H-bridge module during a period of the second duty cycle for the predetermined duration, wherein the portion is further defined as $\Delta a_k$ wherein $$\Delta a_k = \arcsin\left(\frac{\sin(a_k) + \sin(a_{s+1-k})}{2}\right) - a_k,$$

wherein s is the number of H-bridge modules in the plurality, k is the $k^{th}$ H-bridge module in the plurality, and $a_k$ is a switching angle for the $k^{th}$ H-bridge module.

2. The system of claim 1 wherein the first duty cycle includes one pulse (1×) for each period of the first duty cycle before the controller transfers the portion and one pulse (1×) for each period of the first duty cycle after the controller transfers the portion.

3. The system of claim 1 wherein the second duty cycle includes one pulse (1×) for each period of the second duty cycle before the controller transfers the portion and three pulses (3×) for each period of the second duty cycle after the controller transfers the portion.

4. The system of claim 1 wherein the first and second duty cycles are more similar after the controller transfers the portion as compared to before the controller transfers the portion.

5. The system of claim 1 wherein the first and second H-bridge modules each include a plurality of insulated-gate bipolar transistors (IGBTs) connected in an H-bridge configuration and a capacitor connected to at least one of the H-bridge bridge configuration and each of the IGBTs for absorbing DC-link ripple current having a ripple current RMS value, for providing DC voltage having a ripple voltage RMS value, and for storing charge.

6. The system of claim 5 wherein a difference between the ripple current RMS value in the first H-bridge module and the ripple current RMS value in the second H-bridge module before the controller transfers the portion is greater than the difference between the ripple current RMS value in the first H-bridge module and the ripple current RMS value in the second H-bridge module after the controller transfers the portion.

7. The system of claim 5 wherein a difference between the ripple voltage RMS value in the first H-bridge module and the ripple voltage RMS value in the second H-bridge module before the controller transfers the portion is greater than the difference between the ripple voltage RMS value in the first H-bridge module and the ripple voltage RMS value in the second H-bridge module after the controller transfers the portion.

8. The system of claim 5 wherein a difference between the capacitor charge in the first H-bridge module and the capacitor charge in the second H-bridge module before the controller transfers the portion is greater than the difference between the capacitor charge in the first H-bridge module and the capacitor charge in the second H-bridge module after the controller transfers the portion.

9. A method of optimizing fundamental frequency modulation in a cascaded multilevel inverter (CMI) comprising a plurality of H-bridge modules including at least a first H-bridge module and a second H-bridge module, the method comprising:
operating the first H-bridge module according to a first duty cycle;
operating the second H-bridge module according to a second duty cycle and with the first duty cycle being greater than the second duty cycle;
controlling the first and second H-bridge modules utilizing fundamental frequency modulation; and
transferring a portion of the first duty cycle to the second duty cycle by reducing activity of the first H-bridge module during a period of the first duty cycle for a predetermined duration and increasing activity of the second H-bridge module during a period of the second duty cycle for the predetermined duration, and with the portion being defined as $\Delta a_k$; and
computing the portion by solving for $\Delta a_k$ wherein $$\Delta a_k = \arcsin\left(\frac{\sin(a_k) + \sin(a_{s+1-k})}{2}\right) - a_k$$

with s being the number of H-bridge modules in the plurality, k being the $k^{th}$ H-bridge module in the plurality, and $a_k$ being a switching angle for the $k^{th}$ H-bridge module.

10. The method of claim 9 wherein operating the first H-bridge module is further defined as operating the first H-bridge module according to the first duty cycle including one pulse (1×) for each period of the first duty cycle before and after transferring the portion.

11. The method of claim 9 wherein operating the second H-bridge module is further defined as operating the second H-bridge module according the second duty cycle including one pulse (1×) for each period of the second duty cycle before transferring the portion and three pulses (3×) for each period of the second duty cycle after transferring the portion.

12. The method of claim 9 wherein transferring the portion of the first duty cycle causes the first and second duty cycles to be more similar as compared to before the controller transfers the portion.

13. The method of claim 9 wherein the first and second H-bridge modules each include a plurality of insulated-gate bipolar transistors (IGBTs) connected in an H-bridge configuration and a capacitor connected to at least one of the H-bridge bridge configuration and each of the IGBTs and further including the steps of absorbing with the capacitor a DC-link ripple current having a ripple current RMS value, providing with the capacitor a DC voltage having a ripple voltage RMS value, and storing charge with the capacitor.

14. The method of claim 13 wherein transferring the portion of the first duty cycle causes a difference between the ripple current RMS value in the first H-bridge module and the ripple current RMS value in the second H-bridge module to be less than the difference between the ripple current RMS value in the first H-bridge module and the ripple current RMS value in the second H-bridge module before the controller transfers the portion.

15. The method of claim 13 wherein transferring the portion of the first duty cycle causes a difference between the ripple voltage RMS value in the first H-bridge module and the ripple voltage RMS value in the second H-bridge module to be less than the difference between the ripple voltage RMS value in the first H-bridge module and the ripple voltage RMS value in the second H-bridge module before the controller transfers the portion.

16. The method of claim 13 wherein transferring the portion of the first duty cycle causes a difference between the capacitor charge in the first H-bridge module and the capacitor charge in the second H-bridge module to be less than the difference between the capacitor charge in the first H-bridge module and the capacitor charge in the second H-bridge module before the controller transfers the portion.

17. A controller-implemented method for optimizing fundamental frequency modulation in a cascaded multilevel inverter (CMI) comprising a plurality of H-bridge modules including at least a first H-bridge module operable according to a first duty cycle and a second H-bridge module operable according to a second duty cycle being less than the first duty cycle, and with each of the first and second duty cycles comprising a period, said method comprising:

transferring, with the controller, a portion of the first duty cycle to the second duty cycle by reducing activity of the first H-bridge module during the period of the first duty cycle for a predetermined duration and by increasing activity of the second H-bridge module during the period of the second duty cycle for the predetermined duration, and with the portion being defined as $\Delta a_k$; and computing the portion by solving for $\Delta a_k$ wherein $$\Delta a_k = \arcsin\left(\frac{\sin(a_k) + \sin(a_{s+1-k})}{2}\right) - a_k$$

with s being the number of H-bridge modules in the plurality, k being the $k^{th}$ H-bridge module in the plurality, and $a_k$ being a switching angle for the $k^{th}$ H-bridge module.

* * * * *